(12) United States Patent
Hoang et al.

(10) Patent No.: US 6,751,302 B1
(45) Date of Patent: Jun. 15, 2004

(54) METHOD AND APPARATUS FOR PROVIDING AN AUTOMATED SELECTION OF A TELECOMMUNICATION SERVICE FROM AMONG A PLURALITY OF TELECOMMUNICATION SERVICES

(75) Inventors: Minh Hoang, Stoughton, MA (US); Sepehr Mehrabanzad, Southborough, MA (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/479,679

(22) Filed: Jan. 7, 2000

(51) Int. Cl.$^7$ ............................................... H04M 11/00
(52) U.S. Cl. ............................. 379/93.07; 379/220.01; 379/100.12
(58) Field of Search ..................... 379/93.07, 100.01, 379/100.09, 100.12, 100.14, 221.01, 211.01; 358/407, 440, 442

(56) References Cited

U.S. PATENT DOCUMENTS 5,802,153 A    9/1998  Sridhar et al.
5,943,413 A  * 8/1999  Ash et al. .................... 379/406
5,999,598 A  * 12/1999 Henrick et al. .......... 379/93.07

* cited by examiner

*Primary Examiner*—Melur Ramakrishnaiah
(74) *Attorney, Agent, or Firm*—Caroline T. Coker

(57) ABSTRACT

A method and apparatus is provided for providing an automated selection of a telecommunication service from among multiple telecommunication services. In a telecommunication system (100) that includes multiple communication devices (102, 104) and a telecommunication infrastructure (110) including multiple local exchange offices (106, 108), multiple communication channels (112, 114), and multiple telecommunication services, a subscriber to the services of the telecommunication system is able to select a particular telecommunication service by transmitting a service request code via the subscriber's communication device, which service request code corresponds to a request for a telecommunication service. The telecommunication infrastructure then enables or disables the requested telecommunication service in response to receiving the request.

7 Claims, 5 Drawing Sheets

410

METHOD AND APPARATUS FOR PROVIDING AN AUTOMATED SELECTION OF A TELECOMMUNICATION SERVICE FROM AMONG A PLURALITY OF TELECOMMUNICATION SERVICES

FIELD OF THE INVENTION

This invention is generally related to communication systems, and in particular to automated selection of a telecommunication service.

BACKGROUND OF THE INVENTION

The public telephone network is a switched communications system. That is, one party, the calling party, selects the other party, the called party, with whom to communicate by dialing that party's telephone number. The telephone network recognizes that number and connects the circuits via at least one switch, to complete a telephone connection to the called party. The telephone number is sent by pressing the numbers on the telephone key pad or dial, or by selecting a key pad entry that represents a phone number that is held in a telephone's memory. In addition to the familiar wireline telephones found in the home and office, cellular and wireless or radio communications systems also are switched communications systems.

With the advent of digital services provided to telephone service subscribers by telephone carriers, the telephone service subscribers have an ever increasing array of communications systems and networks available to them. For a subscriber to access these systems, the intervention of the operator of the system is normally required. For example, if a subscriber desires to avail himself or herself of the high speed bit rate advantages provided by a T1 line or a Digital Subscriber Line (DSL), the subscriber must contact the local carrier to have a T1 or DSL line installed and to be set up for T1 service. Or if a subscriber desires to transmit and receive packet data, the subscriber must again contact the local carrier to be set up with a packet switched delivery system that connects to a packet node at the telephone carrier's local office and uses the carrier's packet network to transport the data. Furthermore, if a subscriber wishes to use the slower and more reliable X.25 virtual circuit packet system or the faster and less reliable Frame Relay virtual circuit packet system, arrangements must be made in advance with the subscriber's local telephone carrier. Similarly, a subscriber cannot switch between T1 service and plain old telephone service (POTS) at the carrier's end office depending upon whether the subscriber is engaging in a data transmission, requiring greater speed and reliability, or a voice communication, requiring a lower speed and less reliability.

There are a few options that a telephone subscriber can select without the intervention of the operator of the local carrier. For example, a telephone subscriber can select a long distance carrier on a phone call-by-phone call basis. By dialing a "10," which alerts the local carrier that a long distance carrier is about to be selected, and then dialing a five digit long distance carrier (IXC) access code "10xxx" (also known as a Primary interLATA Carrier (PIC) Code), the subscriber is able to establish a communication circuit with a network of a long distance carrier of the subscriber's choice. Also, a telephone subscriber can enable a call return option by dialing "*69." However, the automated selection of a communication system service provided by the local carrier, which service can only be provided over a limited number of trunking lines capable of providing the service, or which service impact the quality of service (e.g., bit rate speed, reliability) being provided to a system user, is not an available option.

Therefore, a need exists for a telecommunication system that provides an automated selection among multiple telecommunication services on a call-by-call basis.

DESCRIPTION OF A PREFERRED EMBODIMENT

Figure 1:
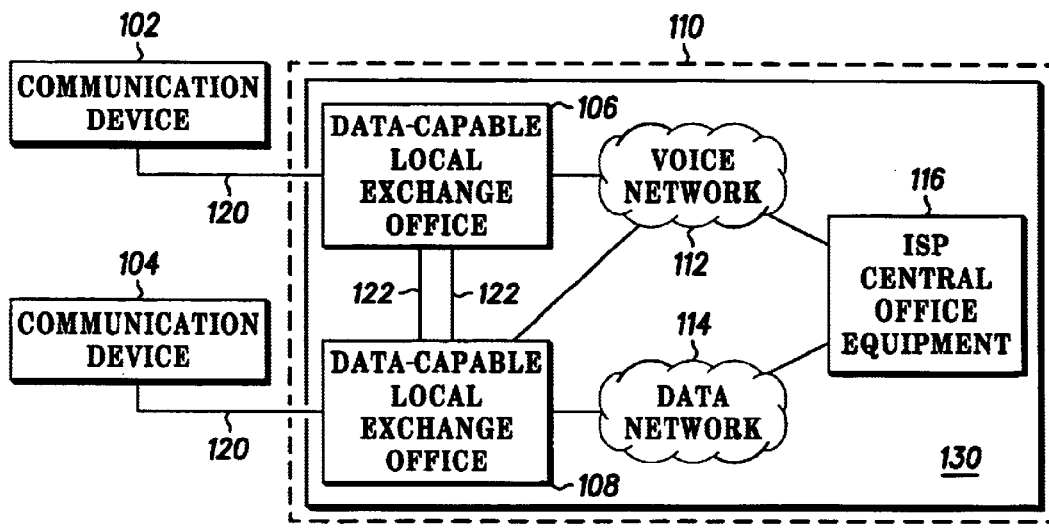
FIG. 1 is a block diagram of a switched telecommunication system in accordance with a preferred embodiment of the present invention.

To address the need for a telecommunication system that provides an automated selection among multiple telecommunication services on a call-by-call basis, a method and apparatus is provided that provides automated selection of a telecommunication service from among multiple telecommunication services. In a telecommunication system that includes multiple communication devices and a telecommunication infrastructure including multiple local exchange offices, multiple communication channels, and multiple telecommunication services, a subscriber to the services of the telecommunication system is able to select a particular telecommunication service by transmitting a service request code via the subscriber's communication device, which service request code corresponds to a request for a telecommunication service. The telecommunication infrastructure then enables or disables the requested telecommunication service in response to receiving the request.

Generally, the present invention encompasses an apparatus for providing an automated selection of a telecommunication service from among the plurality of telecommunication services in a switched telecommunication system that includes a communication unit and the plurality of telecommunication services. The apparatus comprises a signal processing unit, the plurality of telecommunication services, a channel interface device coupled to the signal processing unit, and a processor coupled to the channel interface device and to the signal processing unit. The channel interface device receives a first input signal from the communication device and a subsequent, second input signal from the communication device, wherein the first input signal represents a request to enable or disable a telecommunication service of the plurality of telecommunication services. The processor generates a control signal in response to the input signal. The signal processing unit, in response to the control signal, enables or disables the telecommunication service and processes the second input based on the enablement or disablement of the telecommunication service.

Another embodiment of the present invention encompasses a method for providing for the automated selection of a telecommunication service from among the plurality of telecommunication services in a telecommunication system that includes a communication device and a telecommunication infrastructure, which telecommunication infrastructure includes the plurality of telecommunication services. The method comprises the steps of receiving a first input signal from a communication device, wherein the first input signal comprises a request to enable or disable a telecommunication service and generating a control signal in response to the first input signal. The method further comprises the steps of enabling the telecommunication service in response to the control signal when the request is to enable a telecommunication service, and disabling the telecommunication service in response to the control signal when the request is to disable a telecommunication service. The method further comprises the steps of receiving a second input signal from the communication device and processing the second input signal based on the enablement or disablement of the telecommunication service.

Turning now to the drawings, wherein like numerals designate like components, FIG. 1 illustrates a switched telecommunication system 100 in accordance with a preferred embodiment of the present invention. In the preferred embodiment, the switched telecommunication system 100 includes multiple communication devices 102, 104, such as wireline telephones and wireline modems, that are each linked by a communication channel, preferably a local loop, to a communication infrastructure 110 that preferably includes a public switched telephone network (PSTN) 130. PSTN 130 preferably includes multiple local exchange offices 106, 108 (two shown) and a remote access Internet service provider (ISP) central office 116. Each local exchange office 106, 108 is coupled to ISP central office 116 by a data network 112, or a voice network 114, or both. Data network 112 and voice network 114 each preferably include multiple communication channels, preferably high speed trunk lines. The local loops 120, multiple interoffice trunk lines 122, and multiple high speed trunk lines 112, 114 each preferably include any one or more of telephone lines, T1 lines, ISDN lines, digital subscriber lines, optical fibers, coaxial cables, or a hybrid combination of the above.

Figure 2:
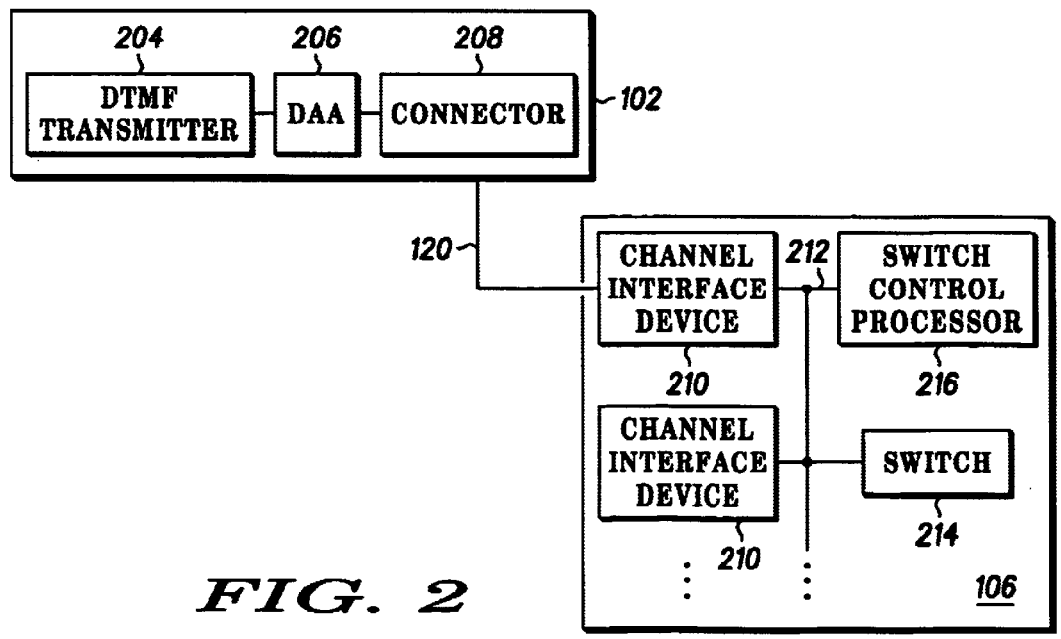
FIG. 2 is a block diagram of a voice-only communication device and a voice-only local exchange office of FIG. 1 in accordance with a preferred embodiment of the present invention.

FIG. 2 illustrates a voice-only communication device 102 coupled to a voice-only local exchange office 106 in accordance with a preferred embodiment of the present invention. Voice-only communication device 102 preferably includes a wireline telephone that preferably uses tone-dialing (i.e., dual tone multifrequency (DTMF) tones), or alternately uses dial-pulsing, to generate a telephone number. Communication device 102 preferably includes conventional telephone circuitry, such as a data access arrangement (DAA) 206 coupled to a DTMF transmitter 204 and to a connector 208. DAA's 206 are well-known in the art and may be made of a variety of discrete components, including analog multiplexers, resistors, capacitors, and operational amplifier/s, or may be embodied in whole or part as an integrated circuit, and performs such functions as impedance matching and power level adjustment. DTMF transmitter 204 encodes each number selected by a user of communication device 102 into a distinct pair of tones to produce a DTMF signal, which DTMF signal is decoded by local exchange office 106 to recover the number. The DTMF signal is then transmit by DAA 206 via connector 208. Communication device 102 further includes a mount, a keypad, and dialing peripherals. The structures of a wireline telephone are well known in the art and need not be described in further detail.

Voice-only local exchange office 106 preferably includes multiple channel interface devices 210 (three shown), wherein each channel interface device 210 is coupled to a switch 214 by a local switch bus 212. The switch 214 is coupled to a switch control processor 216 that includes a processor, such as a microprocessor, and controls the operation of the switch 214. Local exchange office switches 214 are well-known in the art and will not be detailed herein.

Figure 3:
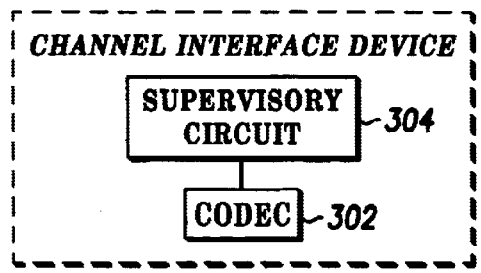
FIG. 3 is a block diagram of a channel interface device of FIG. 2 in accordance with a preferred embodiment of the present invention.

FIG. 3 illustrates a channel interface device 210 in accordance with a preferred embodiment of the present invention. The channel interface device 210 preferably includes a codec (coder-decoder), or analog-to-digital and digital-to-analog converter 302, coupled to a supervisory control circuit 304. Supervisory control circuit 304 preferably includes a processor, such as a microprocessor or a digital signal processor (DSP), that is capable of storing and executing computer programs. Codec 302 converts an inbound analog signal received from a communication device 102 to a digital signal for processing by PSTN 130 and converts an outbound digital signal to an analog signal for transmission by PSTN 130.

Figure 4:
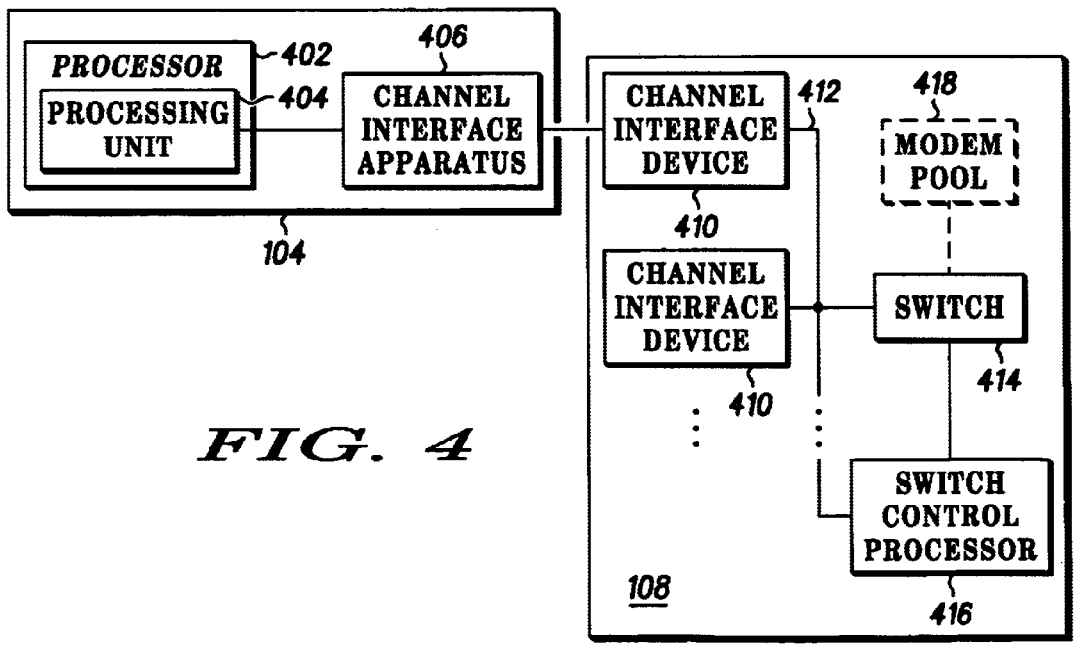
FIG. 4 is a block diagram of a data-capable communication device and a data-capable local exchange office of FIG. 1 in accordance with a preferred embodiment of the present invention.

FIG. 4 illustrates a data communication device (DCD) 104 coupled to a data-capable local exchange office 108 in accordance with a preferred embodiment of the present invention. In the preferred embodiment of DCD 104, a software modem embodiment, DCD 104 is embodied as a set of program instructions. The set of program instructions may be stored on any computer readable medium such as a floppy disk or CD ROM. When loaded into a host processor 402, such as a Pentium.RTM. class microprocessor, DCD 104 utilizes the processing resources and associated memory of host processor 402. Preferably, host processor 402 is a part of a data terminal equipment (DTE), such as a personal computer, workstation, mainframe computer, or other terminal, or, in the alternative, is a part of a fax machine. In the preferred embodiment, DCD 104 further includes a processing unit 404 and a DCD channel interface apparatus 406 coupled to host processor 402. Preferably, processing unit 404 is implemented in host processor 402. Processing unit 404 performs the data transfer-related signal processing operations of DCD 104, such as transceiver training, equalization, echo cancellation, error correction encoding/decoding, and (de)scrambling.

DCD channel interface apparatus 406 preferably includes a DAA coupled to a codec, such as an SGS Thompson ST 7544 or ST 7545. The codec converts an analog signal received from local loop 120 to sampled, digital form, and converts sampled, digital information to analog form for transmission over local loop 120. Channel interface apparatus 406 further includes other structures such as a memory and an interface, which interface couples interface apparatus 406 to the processor 402, as described in detail in U.S. Pat. No. 5,802,153, issued to Sridhar et al., and assigned to the assignee of the present invention and hereby incorporated by reference herein. Similar to communication device 102, DCD 104 also preferably uses tone-dialing, or in the alternative dial-pulsing, to generate a telephone number by processing unit 404, which telephone number is modulated and converted to an analog signal by channel interface apparatus 406 for transmission to PSTN 130.

In an alternate embodiment of the present invention, DCD 104 is a conventional analog or digital modem. DCD 104 preferably is coupled to a DTE, which DTE includes a memory coupled to a host processor, wherein the host processor is capable of running software applications that are stored in the memory. DCD 104 is used to transfer data between the DTE and PSTN 130. In the alternate embodiment, DCD 104 includes a DAA, a codec coupled to the DAA, a DSP, such as a Motorola M56002, coupled to the codec, and a microprocessor, such as a Motorola M68302, coupled to the DSP and to the DTE. The DSP and the microprocessor both comprise and are coupled to associated memories, and both the DSP and the microprocessor contain or operate under a set of multiple data transfer-related applications, such as signal equalization, encoding, decoding, filtering, error correction, and echo cancellation.

Figure 5:
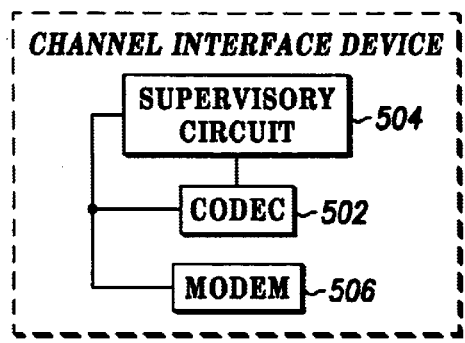
FIG. 5 is a block diagram of a channel interface device with modem of FIG. 4 in accordance with a preferred embodiment of the present invention.

Similar to voice-only local exchange office 106 described above with respect to FIG. 3, data-capable local exchange office 108 preferably includes multiple channel interface devices 410 (three shown), wherein each channel interface device 410 is coupled by a local switch bus 412 to a switch 414 and to a switch control processor 416. Switch control processor 416 is also coupled to switch 414. In an alternate embodiment of the present invention, switch 414 includes a data router. FIG. 5 is an illustration of a channel interface device 410 in accordance a preferred embodiment of the present invention. As shown in FIG. 5, channel interface device 410 preferably includes a codec 502 coupled to a supervisory control circuit 504, which supervisory control circuit 504 preferably includes a processor, preferably a microprocessor or a DSP, that is capable of storing and executing computer programs. Each channel interface device 410 is coupled by a local switch bus 412 to a switch 414. Preferably, each channel interface device 410 further includes a modem 506; however, in an alternate embodiment of the present invention, modem 506 is instead included in a modem pool 418, which modem pool is coupled to switch 414. In another alternate embodiment, at least one modem 506 in modem pool 416 is designed to process signals in a packet data communication system.

In the preferred embodiment, a signal received by PSTN 130 from DCD 104 is converted from analog form to digital form by codec 502. Each modem 506 receives the converted signal from codec 502, or in the modem pool embodiment, from codec 502 via switch 414, and demodulates and remodulates the converted signal to produce a signal capable of being processed by PSTN 130. Modem 506 also executes multiple data transfer-related applications with respect to the received signal, such as decoding, decompression error correction, and adaptive filtering.

Figure 6:
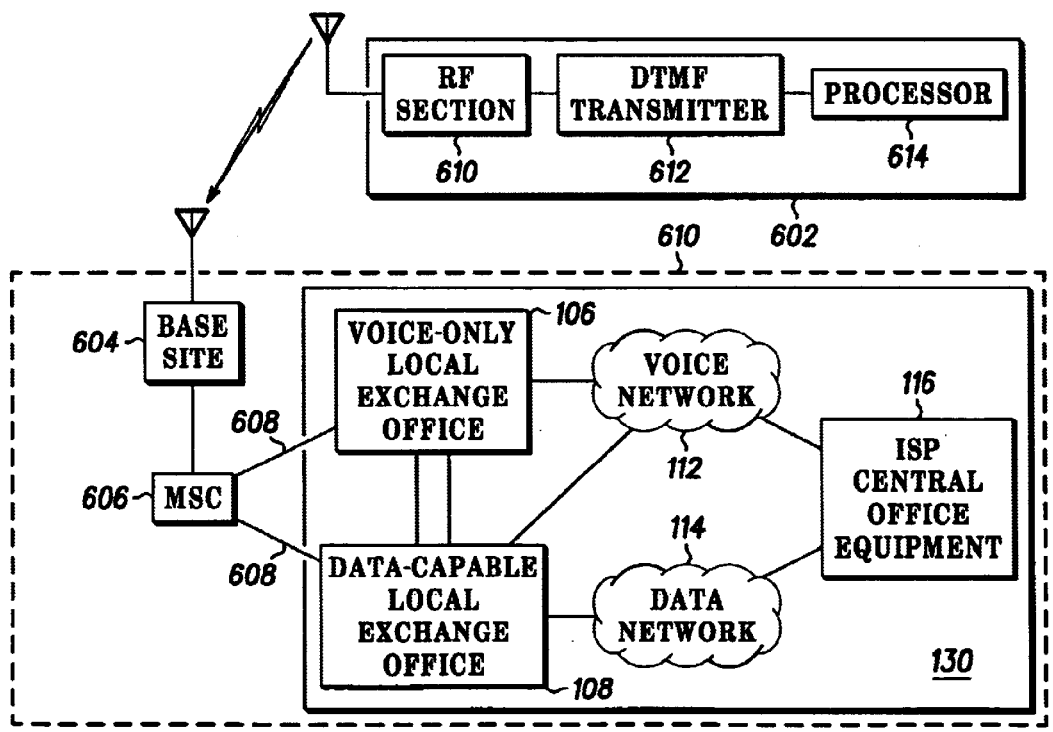
FIG. 6 is a block diagram of a switched telecommunication system in accordance with an alternate embodiment of the present invention.

FIG. 6 illustrates a switched telecommunication system 600 in accordance with an alternate embodiment, a wireless network embodiment, of the present invention. In the wireless network embodiment, switched telecommunication system 600 includes a communication device 602, preferably a wireless communication device such as a radiotelephone or a cellular telephone. Communication device 602 preferably includes conventional telephone circuitry found in present digital cellular telephones, such as a radio frequency (RF) section 610 that transmits and receives RF transmissions, a DTMF transmitter 612 coupled to RF section 610, and a processor 614 coupled to DTMF transmitter 612. The telephone circuitry further includes a keypad, dialing peripherals, and a battery operated power supply. The structures of a cellular telephone and a radiotelephone are well known in the art and need not be described in further detail.

In another alternate embodiment, communication device 602 includes a wireless modem. The wireless modem includes the same elements as DCD 104 and further includes an RF section coupled to the DAA, which RF section transmits analog signals received from the DAA and receives signals transmit by a base site 604. The numbers dialed by a user of communication device 602 are typically modulated onto an analog waveform based on a digital modulation scheme, such as quadrature amplitude modulation (QAM), and transmitted to base site 604 via a control channel.

Switched telecommunication system 600 further includes a communication infrastructure 610 that includes a mobile switching center (MSC) 606 coupled to a base site 604 and to PSTN 130. Base site 604 preferably includes an "iDEN" Enhanced Base Transceiver Site (EBTS) that is commercially available from Motorola, Inc. of Schaumburg, Ill. MSC 606 preferably includes a "MOTOROLA" Mobile Switching Center that also is commercially available from Motorola, Inc. of Schaumburg, Ill. RF signals transmitted by communication device 602 are received by PSTN 130 via base site 604 and MSC 606.

Figure 7:
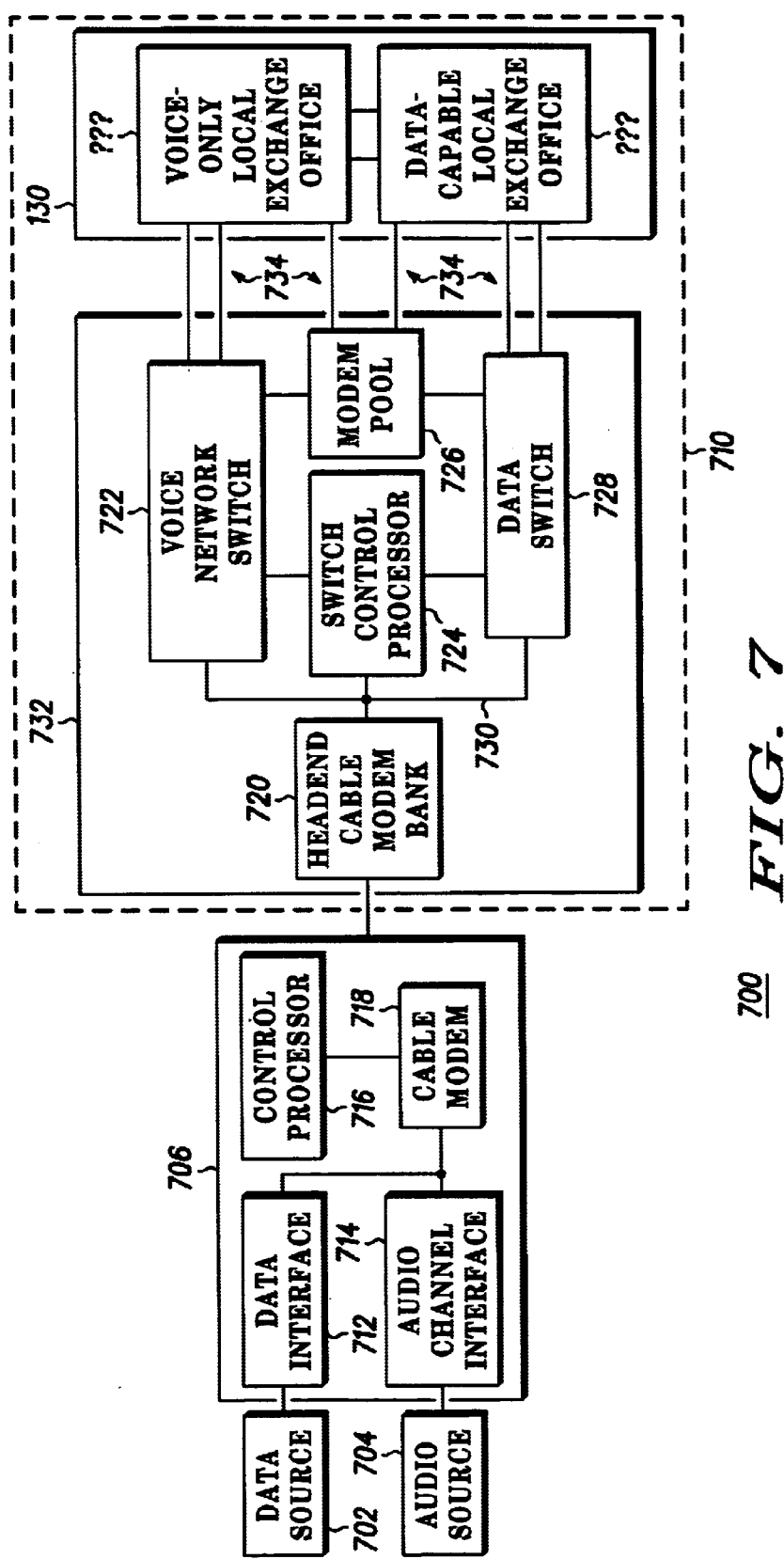
FIG. 7 is a block diagram of a switched telecommunication system in accordance with an alternate embodiment of the present invention.

FIG. 7 illustrates a switched telecommunication system 700 in accordance with another alternate embodiment, a cable network embodiment, of the present invention. In the cable network embodiment, switched telecommunication system 700 includes a communication device 706, preferably a cable communication device such as a customer cable premise equipment (CCPE), and a communication infrastructure 710 that includes cable headend equipment 732 coupled to PSTN 130 by multiple trunk lines 734. CCPE 706 is coupled to a data source 702, such as a DTE or a fax machine, or to an audio signal source 704, such as a telephone. In the cable network embodiment, CCPE 706 is further coupled to cable headend equipment 732 by a cable plant 708, preferably a hybrid fiber coaxial (HFC) network that includes multiple optical fibers and multiple coaxial cables. CCPE 706 preferably includes a cable modem 718 that is coupled to a data interface 712, to an audio channel interface 714, and to a control processor 716. CCPE 706 receives a signal from either data source 702 via data interface 712 or from audio signal source 704 via the audio channel interface 714, digitizes the signal if it is an audio signal, compresses the signal, modulates the signal using a digital modulation scheme, preferably a quadrature amplitude modulation (QAM) scheme, and converts the signal to an analog signal. CCPE 706 then transmits the analog signal to cable headend equipment 710 via HFC network 708.

Cable headend equipment 732 preferably includes a headend cable modem bank 720 that is coupled to a voice network switch 722 and to a data switch 728 by a local bus 730. Headend cable modem bank 720 preferably includes multiple cable modems, wherein each cable modem is coupled to HFC 708 and to local bus 730. Voice network switch 722 and data switch 728 are each also coupled to modem pool 726, and to a switch control processor 724, which switch control processor 724 preferably includes a processor, such as a microprocessor or a DSP, that is capable of storing and executing computer programs. In an alternate embodiment of the present invention, data switch 728 includes a data router. Cable headend equipment 732 is coupled to PSTN 130 via multiple high speed trunk lines 732.

Cable headend equipment 732 receives an analog signal from CCPE 706. A cable modem in headend cable modem bank 720 converts and demodulates the analog signal, then modulates the signal for transmission via a switch 722, 728 to PSTN 130. Switch control processor 724 determines whether the signal includes an audio signal or data, and routes the signal to voice network switch 722 or data switch 728 based on the determination. Switch control processor also determines a trunk line 732 for the subsequent routing of the signal by the respective switch 722, 728 to PSTN 130.

The operation of telecommunication system 100 is as follows in accordance with the preferred embodiment. In the case of communication device 102, or alternately communication device 602, the user of the communication device (i.e., a subscriber to the telecommunication services of telecommunication system 100) selects a service request code by inputting the code into the communication device. Preferably, the service request code is a sequential series of numbers, which series of numbers corresponds to a telecommunication service provided by PSTN 130. The code is input by the manual operation of push button switches on a keypad, which switches generate DTMF signals that are transmitted to PSTN 130 as described above. In the case of communication device 104, a DTE user selects a service request code preferably via a keyboard coupled to the DTE or a "mouse" coupled to the DTE, in response to which DTMF tones corresponding to a service request code number are generated by host processor 402 and then processed for transmission to PSTN 130 as described above.

It may be noted that present PTSN 130 equipment demodulates a modulated signal received from a communication device and decodes the received DTMF tones to produce the selected service request code for control of PTSN 130 equipment. Present PTSN 130 equipment also encodes sequential series of numbers to produce DTMF tones when PTSN 130 equipment is sending to a communication device 102, 104, 602, or to cable headend equipment 710. The capability to transmit and process all of the above signals is already provided in existing telephone, modem, and cable equipment. No changes are required to handle those signals in telephones, modems, PTSN 130 switches, cellular telephone equipment, base sites, mobile switching centers, or cable headend equipment to support the invention.

In a preferred embodiment of the present invention, upon reception of the signal corresponding to the service request code at PSTN 130, a channel interface device 210, 410 processes the received signal as described above. The received signal is converted, and in the case of a signal received from DCD 104 or communication device 602, demodulated and remodulated, by channel interface device 210, 410 to produce a digital signal corresponding to the service request code number, and the digital signal is then routed to a switch control processor 216, 416. Switch control processor 216, 416 generates a control signal in response to the digital signal, and the control signal is conveyed to a switch 214, 414. In response to the control signal, the switch 214, 414 establishes a communication circuit including communication channels represented by the service request code number. Signals subsequently received by PSTN 130 from the requesting communication device 102, 104, or 602 are then routed over the established communication circuit.

For example, the user of a communication device such as communication devices 102, 104 or 602 may avail himself or herself of the high speed bit rate advantages provided by a Digital Subscriber Line (DSL) trunk line in either voice network 110 or data network 112 by dialing or otherwise inputting a service request code corresponding to a request to use a DSL line. The respective channel interface device 210, 410 decodes the transmission from the communication device 102, 104, conveys the decoded information to the respective switch control processor 216, 416. The respective switch control processor 216, 416 generates a control signal in response to the receipt of the decoded request and conveys the control signal to the respective switch 214, 414, which switch then establishes a communication circuit for the user that utilizes a DSL line. Similarly, if a user of a communication device such as communication device 104 or 602 desires to transmit packet data, the subscriber inputs a service request code representative of packet data service. Channel interface device 410 decodes the received request and conveys the decoded request to switch control processor 416. Switch control processor 416 determines that the number represents a request to use a packet switched delivery system, generates a control signal in response to the request and conveys the control signal to switch 414, which switch 414 establishes a communication circuit that includes a modem in modem pool 418 which modem has been designed to process packet data. Packet data subsequently received by PSTN 130 from the requesting communication device is then routed through the packet data modem.

Similarly, a user of a data source 702, such as a DTE, or an audio source 704, such as a conventional telephone, coupled to CCPE 706 can request the establishment of a particular communication circuit in cable headend equipment 732. The user dials or inputs a service request code into the data source 702 or audio source 704. CCPE 706 digitizes the signal if it is an audio signal, and compresses, modulates, and converts the service request code to an analog signal, and transmits the analog signal to PSTN 736 via cable headend equipment 732. The service request code is received and demodulated by a cable modem in headend cable modem bank 720. The demodulated signal is conveyed to switch control processor 724, which switch control processor 724 generates a control signal that is conveyed to voice network switch 722 or data switch 728 and which switch 722, 728 establishes the requested communication circuit in response to the control signal.

In general, the present invention provides for a communication system for providing automated switching among multiple two-way communication system services. A subscriber to the services of the communication system can select among an array of communication system services, such as use of a packet data service and packet data trunking lines or use of high speed DSL trunking lines, by dialing a number into a telephone or selecting an icon on a computer monitor. The number dialed comprises a service request code number that is converted into a sequence of digital codes, which digital codes are then transmitted to PSTN 130. Similarly, the selection of an icon is converted to a digital sequence representative of a service request code number, which digital sequence is transmitted to PSTN 130. PSTN 130 decodes the received digital sequence and, based on the digital sequence, activates a switch to establish a communication circuit that incorporates the trunking lines appropriate for the type of communication system service requested by the system subscriber. The entire operation is automated and the intervention of the system operator is not required, saving costs and time. Furthermore, by allowing a system subscriber to select a two-way communication system service on a call-by-call basis rather than dedicating particular lines to particular subscribers for the provision of particular services, telecommunication system capacity and efficiency is improved.

In an alternate embodiment of the present invention, a DCD 104 may transmit a service request code that corresponds to a desired level of signal processing service, such a higher speed and lower reliability service in which some data transfer-related algorithms are disabled or a lower speed and higher reliability service in which additional data transfer-related algorithms are enabled. For example, for higher speed and lower reliability service, the service request code may correspond to the disabling of an echo cancellation algorithm or a channel filter algorithm or to the adjustment of a signal processing algorithm that includes multiple operations, such as the disabling of an error correction algorithm of Reed-Solomon coding, which coding includes a syndrome calculation algorithm and an error correction algorithm. As above, the service request code is converted, demodulated, and remodulated by channel interface device 410 to produce a digital signal corresponding to the service request code number. The digital signal is conveyed to supervisory control circuit 504, and supervisory control circuit 504 generates a control signal in response to the digital signal. The control signal is conveyed to modem 506, in response to which modem 506 enables or disables at least one data transfer-related algorithm. The enabled, or disabled, algorithm is then respectively executed, or not executed, in the processing of signals subsequently received by PSTN 130 from communication device 104.

For example, the user of communication device 102, 104 (i.e., the user of the data source associated with communication device 104), or 602, or of CCPE 706 (i.e., the user of a data source 702 or audio source 704 coupled to CCPE 706), adjusts a data transmission rate by dialing or otherwise inputting a service request code number that corresponds to the disabling or adjustment of at least one data transfer-related application in modem 506. For example, the service request code may correspond to the selection of a full rate pulse code modulation (PCM) link (e.g., 56 to 64 kilobits per second (Kbps) mu-Law or A-Law) instead of an audio compressed mode link, such as an adaptive differential pulse code modulation (ADPCM) link (e.g., 32, 24, or 16 Kbps) which will degrade a modem-to-modem data throughput. The communication device 102, 104, or 602 transmits the service request code to PSTN 130 (or to cable headend equipment 732 in the case of CCPE 706), where a channel interface device 410 (or a modem in cable modem bank 720 in the case of CCPE 706) processes the signal, generates a control signal and disables the execution of the audio compression algorithm by modem 506 in channel interface device 410. In the case of CCPE 706, the service request code is transmitted by CCPE 706 to cable headend equipment 732, where a modem in headend cable modem bank 720 processes the signal and conveys the signal to switch control processor 724. Switch control processor 724 then generates a control signal in response to the received signal request code and conveys the control signal to a modem in either headend cable modem bank 720 or modem pool 726. The modem then disables the execution of the audio compression algorithm in response to the control signal.

In general, the present invention as described above provides a subscriber to the services of a telecommunication system with the ability to make an automated selection of the type of telecommunication services that he would like to utilize. A subscriber engaging in a conventional voice-only telephone call could select a low speed voice mode, and a subscriber engaging in a data transmission could select a higher speed DSL mode and could be charged a premium for this selection. Furthermore, a subscriber engaging in a wireless data transmission might enable additional data transfer-related algorithms because of the lower reliability of a wireless transmission, as compared to a subscriber engaging in a wireless voice communication, which requires less reliability than a data transmission, or a subscriber engaging in a wireline data transmission. The subscriber engaging in the wireless data transmission would then pay a premium for the additional telecommunication services.

By automating the system, it is possible to implement a "pay as you go" type of system, where telecommunication system efficiencies are enhanced because services are provided only when needed and requested. This allows for greater utilization of available services and reduces the quantity of redundant services that need to be provided, since services such as DSL transmission modes or packet data modems need not be dedicated to users whose use will be irregular. Furthermore, by automating the system, the time and cost of operator intervention is eliminated.

Figure 8:
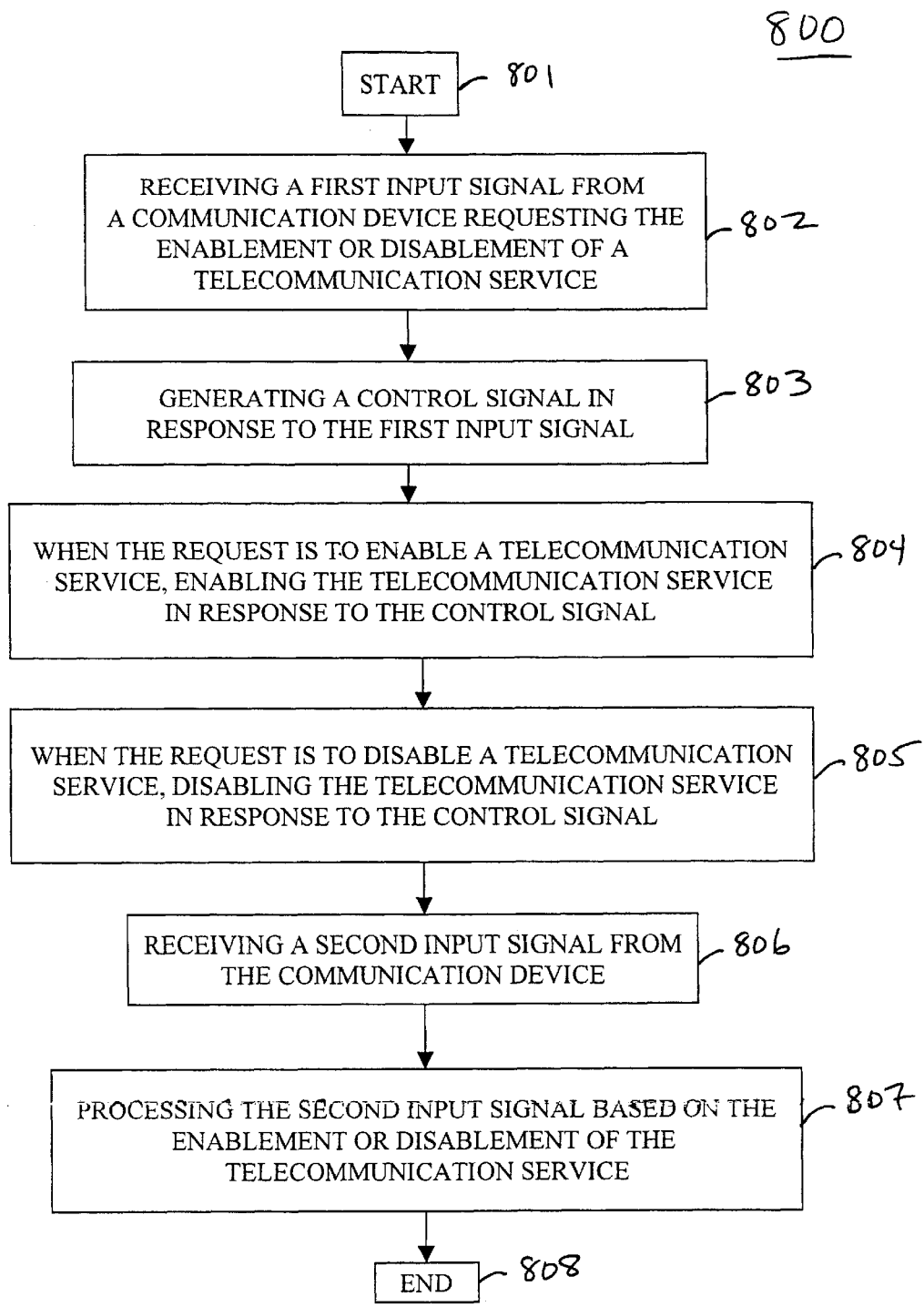
FIG. 8 is a logic flow diagram of steps executed by an apparatus to provide an automated selection of a telecommunication service from among multiple telecommunication services in accordance with a preferred embodiment of the present invention.

FIG. 8 illustrates a logic flow diagram 500 of steps executed by an apparatus in a telecommunication system to provide automated selection of a telecommunication service from among multiple telecommunication services, wherein the apparatus comprises a channel interface device, a signal processing unit, a processor, and the multiple telecommunication services. The logic flow begins (801) when the apparatus, preferably the channel interface device, receives (802) a first input signal via a communication channel requesting the enablement or disablement of a telecommunication service. Preferably, the first input signal is transmit by a communication device, such as a telephone or a modem, and includes an analog derivation of a service request code. Preferably, the service request code is input into the communication device by a subscriber to the services of the telecommunication system and represents a request to enable or disable a telecommunication service, such as a request to use a high speed trunk line or a particular bit rate, or a request to enable or disable a data transfer-related signal processing application.

The channel interface device converts the first input signal to a digital signal and conveys the digital signal to the processor. The apparatus, preferably the processor, generates (803) a control signal in response to the first input signal, and conveys the control signal to the signal processing unit. When the request is to enable a telecommunication service, the apparatus, preferably signal processing unit, enables (804) the telecommunication service in response to the control signal. When the request is to disable a telecommunication service, the apparatus, preferably signal processing unit, disables (805) the telecommunication service in response to the control signal. The apparatus, preferably the channel interface device, receives (806) a second input signal from the communication device, the apparatus, preferably the signal processing unit, processes (807) the second input signal based on the enablement or disablement of the telecommunication service, and the logic flow ends (808). For example, if the request is to use a high speed trunking line, a signal processing unit, preferably a switching unit, would establish a communication circuit that includes the high speed trunking line in response to the control signal received from a processor, preferably a switch control processor. By way of another example, if the request is to disable a data transfer-related algorithm such as echo cancellation, then a signal processing unit, preferably a modem, would disable the data transfer-related algorithm in response to a control signal received from a processor, preferable a supervisory control circuit.

In general, the present invention, as described above with respect to FIG. 8, provides a method by which a communication system provides an automated selection of a telecommunication service. In response to a service request code received from a subscriber to the system's services, the telecommunication system provides the requested telecommunication services. By providing an automated method that does not require the intervention of the system operator, system operating costs are reduced and system efficiency is improved.

Generally, the present invention encompasses a method and apparatus that provides for the automated selection of a telecommunication service from among multiple telecommunication services. The need for operator intervention in the provision of the services is eliminated, allowing system subscribers to select a two-way communication service on a call-by-call basis by merely dialing in a service request code. Allowing customers to select a service on a call-by-call basis, rather than requiring an operator to intervene to establish a particular circuit or requiring the dedication of particular lines to particular subscribers, results in reduced operating costs for the system operator, increased subscriber access to the system services, and improved system capacity. Furthermore, system efficiency and utilization is enhanced since subscribers the selection of services on a call-by-call basis allows for greater reuse of services and reduces the need for the provision of vast quantities of redundant services.

While the present invention has been particularly shown and described with reference to particular embodiments thereof, it will be understood by those skilled in the art that various changes in form and details may be made therein without departing from the spirit and scope of the present invention.

We claim:

1. In a switched telecommunication system comprising a plurality of telecommunication services, an apparatus for providing an automated selection of a telecommunication service from among the plurality of telecommunication services, the apparatus comprising:

signal processing unit;

a plurality of telecommunication services;

a plurality of channel interface devices, each coupled to the signal processing unit, wherein at least one of the channel interface devices receives a first input signal from a communication device and converts the first input signal to produce a corresponding digital signal and receives a subsequent second input signal from the communication device, and wherein the first input signal represents a request to enable or disable a telecommunication service of the plurality of telecommunication services;

a processor coupled to said at least one channel interface device and to said signal processing unit, wherein said processor generates a control signal in response to the digital signal corresponding to the first input signal generated by said at least one channel interface device; and wherein said signal processing unit, in response to the control signal, enables or disables the telecommunication service and processes the second input based on the enablement or disablement of the telecommunication service.

2. The apparatus of claim 1, wherein the signal processing unit comprises a modem and wherein each telecommunication service of the plurality of telecommunication services comprises a data transfer-related application.

3. The apparatus of claim 1, wherein the channel interface device comprises a modem.

4. The apparatus of claim 1, wherein the signal processing unit comprises a switching device, wherein the switching device comprises an input and a plurality of outputs, wherein each output of the plurality of outputs is coupled to a communication channel of a plurality of communication channels, wherein a first communication channel of the plurality of communication channels is capable of providing a telecommunication service that a second communication channel of the plurality of communication channels is not capable of providing, wherein the input signal comprises a request to enable the telecommunication service provided by the first communication channel, and wherein the switching device enables the telecommunication service by creating a signal path from the switching device input to the first communication channel.

5. The apparatus of claim 4, wherein the switching device comprises a router.

6. The apparatus of claim 4, wherein each communication channel of a plurality of communication channels comprises a trunking line.

7. The apparatus of claim 4, wherein the telecommunication service comprises a bit rate.

* * * * *